C. T. CHESTER.
Electric Battery.
No. 86,134.
Patented Jan. 26, 1869.
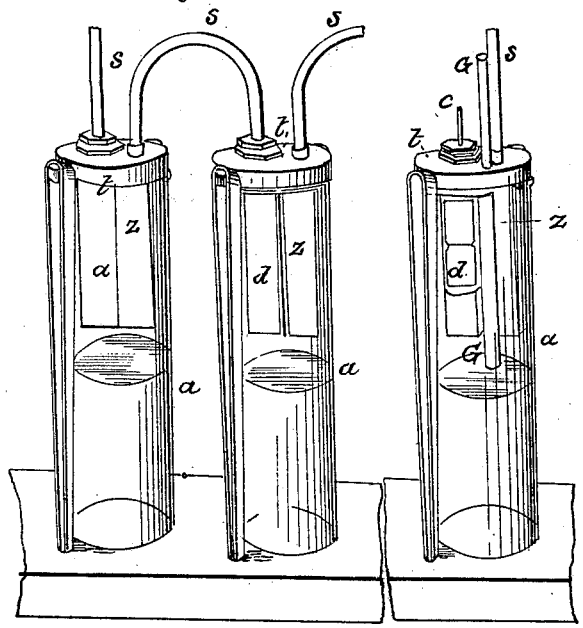

United States Patent Office.

CHARLES T. CHESTER, OF ENGLEWOOD, NEW JERSEY.

Letters Patent No. 86,134, dated January 26, 1869; antedated January 18, 1869.

IMPROVEMENT IN GALVANIC BATTERIES.

The Schedule referred to in these Letters Patent and making part of the same.

Be it known that I, CHARLES T. CHESTER, of the village of Englewood, county of Bergen, and State of New Jersey, have invented certain Improvements in Galvanic Batteries; and I do hereby declare that the following is a full and exact description of these improvements, reference being made to the accompanying drawings, the same letters indicating the same parts in each.

The chief object of my improvements is to produce a powerfully intense current of electricity, which can be made instantly available without the necessity of handling plates and acids, although the battery-combination may have been placed out of use for an indefinite time; and, to achieve this result, it is evident that I must completely do away with the liability to local action and evaporation. I therefore place my battery-plates in an air-tight vessel, only partially filled with the exciting-fluid; and this fluid is of such a nature as not to produce gas during the action of the battery, although, if deemed advisable to employ gas-producing agents, I have provided against any injury from expansion within the chamber. The plates are attached to the metallic cover of the glasses, and they do not touch the fluid until the battery is inverted, and then the tight cover prevents the leakage of the fluid.

But, more particularly to describe the construction, I refer to the drawings, in which—

Figure 1 represents two batteries, combined together, and

Figure 2, a single cell, modified to be adapted to gas-generating combinations. Fig. 2 also exhibits my method of connecting the carbon element with its metallic conductor.

*a* represents the glass cell, sunk in a block of wood. The top of this small glass is carefully ground.

The zinc plate *z* is cast as a part of the top, *t*. This top has a piece of soft-rubber packing interposed between it and the ground-glass top of the tumbler. Two ears also project from it, and from these ears two rubber bands proceed to the block beneath, and, by their elasticity, powerfully press the zinc top against the rubber packing.

The carbon element *d* is made to connect with the small metallic rod *c*, by sewing them together, with a thread of platinum wire, and also allowing this lacing-wire to press a small flat piece of platinum against the sides of the carbon *d*, thus forming a complete and reliable connection.

The carbon plate is also carefully insulated from the zinc top by a bushing of hard rubber, and the rubber packing under the zinc top, and a washer of soft rubber interposed between the upper part of the zinc top, and a screw-nut, which binds the carbon plate up to the zinc top, completes the air-tight insulation.

The small rod *c*, projecting from and forming the metallic contact with the carbon element, is turned of a certain uniform size, and a pin, exactly corresponding in size, projects from the zinc.

A spiral spring, *s*, slips over these pins, and, by its elasticity, secures an excellent and quickly-made connection from one battery to another.

The two plates of zinc and carbon are brought quite close together, and a very small piece of cloth inserted between them, partly to keep them from touching, and also to retain a little moisture. The glasses being half filled with water, and a little bisulphate of mercury added, a sufficient number being coupled together, are inverted.

The fluid immerses the plates, and, on being returned to their normal position, they will remain charged so as to give off a current forty-eight hours after immersion. This current, though of small "quantity" power, is still enough to charge a long telegraph-line, or pass through the body with great power. They have, for any circuit of high resistance, all the "quantity" necessary, and, combined with it, immense intensity in a portable form. A force equal to two hundred Groove cells can be represented in a portable form.

The same construction can be adopted for larger batteries, but, where the plates are very heavy, I have used bolts and nuts, in place of India-rubber bands, to bind the tops on the glasses, although I prefer the rubber bands, since, by their elasticity, they allow gas to escape, and since they allow of the taking apart and putting together of the combination with great ease.

Where, in larger batteries, it is preferred to use plates and acids that produce gas, a glass tube, G G, is inserted through the zinc cover. (See fig. 2.) This tube passes below the ends of the plates, but not into the liquid. By adjusting the quantity of fluid used, and by using care in inverting the battery, the internal opening of the glass or rubber tube may always connect with the air of the closed chamber, and thus relieve expansion and contraction, and also dispose of any gas, which, if created in much quantity, would put an unnecessary and dangerous pressure upon the air-tight cell.

I have found this battery chiefly useful where very intense currents are required, without much quantity-power, and, to produce them, I have simply to give a quick immersion of the plates, and I can use the currents that are produced from the moistened cloth for several hours.

I do not, in this battery, claim any particular combination of plates and acids; but What I do claim, and desire to secure by Letters Patent, is—

1. An air-tight packed battery, combined in series, the plates being attached to the cover, and the cover brought forcibly against the top of the cells by springs or bolts, so that, when inverted, the plates may be immersed in the exciting-fluid, and the battery brought into action, substantially as described.

2. The connection of the carbon element with its metal conductor by the lacing, through holes in the carbon, of a wire, not oxidizing in the fluid used.

3. In a covered battery, forming its zinc element and cover both in one piece.

4. The connection of batteries in series by means of spiral springs, fitting over metal pins.

CHARLES T. CHESTER.

Witnesses:
S. A. STEBBINS,
VAN ZANDT DAWES.